United States Patent
Fan

(10) Patent No.: US 7,145,676 B2
(45) Date of Patent: Dec. 5, 2006

(54) COMPOUND DOCUMENT IMAGE COMPRESSION USING MULTI-REGION TWO LAYER FORMAT

(75) Inventor: Jian Fan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1037 days.

(21) Appl. No.: 09/774,074

(22) Filed: Jan. 31, 2001

(65) Prior Publication Data

US 2002/0101609 A1  Aug. 1, 2002

(51) Int. Cl.
*H04N 1/60*  (2006.01)

(52) U.S. Cl. .................. 358/1.15; 358/500; 358/504; 358/406

(58) Field of Classification Search .............. 358/1.15, 358/450, 444, 540, 426, 432–433, 437, 261.3–261.4, 358/500, 518, 456, 539, 504, 406; 38/117, 38/114–116; 395/114–117
See application file for complete search history.

(56) References Cited

U.S. PATENT DOCUMENTS

| | | | |
|---|---|---|---|
| 5,243,414 A * | 9/1993 | Dalrymple et al. | 358/500 |
| 5,488,483 A | 1/1996 | Murayama | 358/426 |
| 5,638,498 A | 6/1997 | Tyler et al. | 395/117 |
| 5,706,096 A | 1/1998 | Koike | 358/261.2 |
| 5,758,042 A | 5/1998 | Deschuytere | 395/114 |
| 5,778,092 A | 7/1998 | MacLeod | |
| 5,982,937 A | 11/1999 | Accad | |
| 5,991,515 A * | 11/1999 | Fall et al. | 358/1.15 |
| 6,809,741 B1 * | 10/2004 | Bates et al. | 345/597 |
| 6,856,428 B1 * | 2/2005 | Lermant et al. | 358/1.9 |

FOREIGN PATENT DOCUMENTS

EP        1006716 A2       6/2000

\* cited by examiner

*Primary Examiner*—Thomas D. Lee
*Assistant Examiner*—Stephen Brinich

(57) ABSTRACT

Two layer formatting of documents for compatibility with two layer formatting schemes while maintaining color information and edge sharpness for text. A document is divided into multiple regions based upon bodies of text having the same color. A text layer and a non-text layer are specified for each region. The text layer includes a text color along with binary values for each pixel to specify whether to use the text color or a background color. The non-text layer includes a red-green-blue value for each pixel to specify its color for both image or non-text information including the background color for the bodies of text. The text layer is compressed using a lossless compression method and the non-text layer is compressed using a lossy compression method.

16 Claims, 4 Drawing Sheets

COMPOUND DOCUMENT IMAGE COMPRESSION USING MULTI-REGION TWO LAYER FORMAT

FIELD OF THE INVENTION

The present invention relates to an apparatus and method for compressing images and text within a document using a two layer format and a separate compression technique for each format.

BACKGROUND OF THE INVENTION

A standard for formatting documents includes portable document format (PDF), a page description language used by, for example, the Adobe Acrobat program. Formatting a document as a PDF file means that the document can be transmitted, such as through attachment to an e-mail, without a loss of formatting of the information in the document. Using a PDF viewer, a recipient of the document can open and view the document, and it will have the same format as when transmitted. In comparison, when a document is transmitted in a format according to a word processing program, some of the formatting can be lost or altered. Therefore, conversion of documents to PDF files preserves the original formatting.

Certain types of document compression methods, however, are not supported by the current PDF or the Adobe Acrobat program. Those types of compression include Mixed Raster Content (MRC) compound image compression, an International Telecommunication Union T.44 standard. MRC compression uses three layers: a text layer, a color layer, and a non-text layer. Each of the three layers is independently and individually compressed. The Adobe Acrobat program and the latest PDF 1.3 only support two layers of compression and, therefore, cannot open and display those documents formatted with MRC compression or other compression methods using more than two layers. The use of the three layer compression serves a valuable purpose in reducing the amount of storage required for documents while still maintaining a particular image quality along with color information for the document. It would be useful to have a document formatting scheme that maintains color information for a document and has compatibility with standard formatting for compressing the document.

SUMMARY OF THE INVENTION

Methods consistent with the present invention are used for formatting a document by dividing it into regions. For a plurality of the regions a text layer is specified for text and a non-text layer is specified for non-text or image information. Color information is identified for the text in the text layers. Color information may also be specified for images or other non-text information in the non-text layers including a background color for the text. The two layers can be compressed and stored using different compression techniques.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments consistent with the present invention divide an image into, for example, rectangular regions such that all text within a region has a uniform color under certain criteria. Each region is separated into two layers, a layer of text within the region and a layer of non-text information. Both layers have the same size as the region in this example. The text layer is represented by, for example, a binary two-dimensional matrix having values "0 " and "1." Bit value "1" means that the pixel is a text pixel and bit value "0" means the pixel is not a text pixel; different values can alternatively be used. Moreover, the color of the text can be represented by, for example, three 8-bit numbers R, G, and B for the red, green, and blue color values. The non-text layer is represented by, for example, a two-dimensional matrix that uses three 8-bit numbers (R, G, B) for every pixel to specify its color or for groupings of pixels to specify their collective or common color. Different compression techniques can then be used to independently compress the text and non-text layers.

The use of R, G, B values is known in the art and includes the use of three bytes of information for each pixel. A first byte specifies the value of the color red for the pixel, a second byte specifies the value of the color green for the pixel, and a third byte specifies the value of the color blue for the pixel. Each byte, having eight bits, has a value within the range 0–255 (binary 0000 0000 to 1111 1111). The value specifies the shade or intensity of each color. For example, a value "0" for red means no red color, a value "128" specifies a medium shade of red, and a value "255" specifies pure red. Since red, green, and blue constitute the primary colors, various values of each can be specified to generate many different colors. Other types of color designations can alternatively be used for the text layers and pixels (or groupings of pixels) in the non-text layers.

By dividing the document into different regions, color information for the text can be maintained while only using two layers. By using only two layers, the document can be formatting and transmitted according to any two layer formatting scheme. PDF is only one such example of a two layer formatting scheme, and other schemes can be used. The terms "portable document format" and "PDF" as used in this specification include a page description language as used by, for example, the Adobe Acrobat program or any other program that can implement a particular page description language or other technique for formatting documents. As an alternative to the use of PDF, imaging techniques can be used to obtain an electronic image of a document for use in formatting it.

Figure 1:
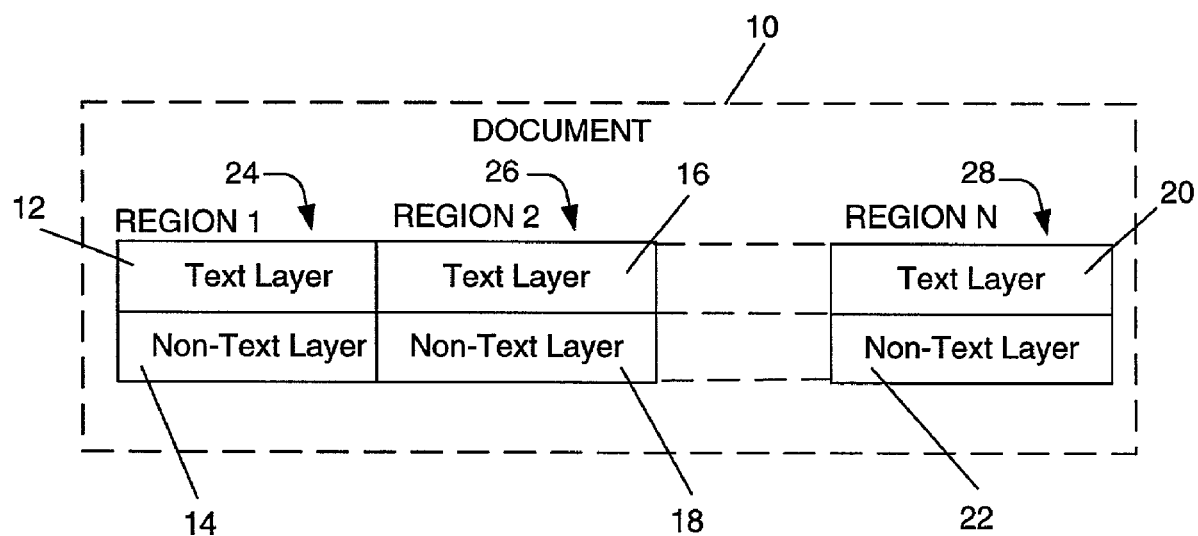
FIG. 1 is a diagram conceptually illustrating a two layer document format including text layers and non-text layers.

FIG. 1 is a diagram conceptually illustrating a two layer format for a document 10 including text layers and non-text layers. Document 10 is divided into multiple regions, as conceptually illustrated by regions 24, 26, and 28, based upon colors of bodies of text. All of the text in region 24, in this example, has the same color. Other methods of defining regions such as grouping of text having related or complementary colors may be used. The regions each define a physical space within the document, and each region is formatted with a text layer and a non-text layer. Region 24 has a text layer 12 and a non-text layer 14; region 26 has a text layer 16 and a non-text layer 18; and region 28 has a text layer 20 and a non-text layer 22. Each text layer represents the text within the physical space of the corresponding region. Each non-text layer represents the image or non-text information within, for example, the same physical space of each region as the corresponding text layer. Regions 24, 26, and 28 are shown conceptually in FIG. 1 and the illustrated layers are not necessarily intended to represent the actual physical size or dimensions of each region.

Figure 2:
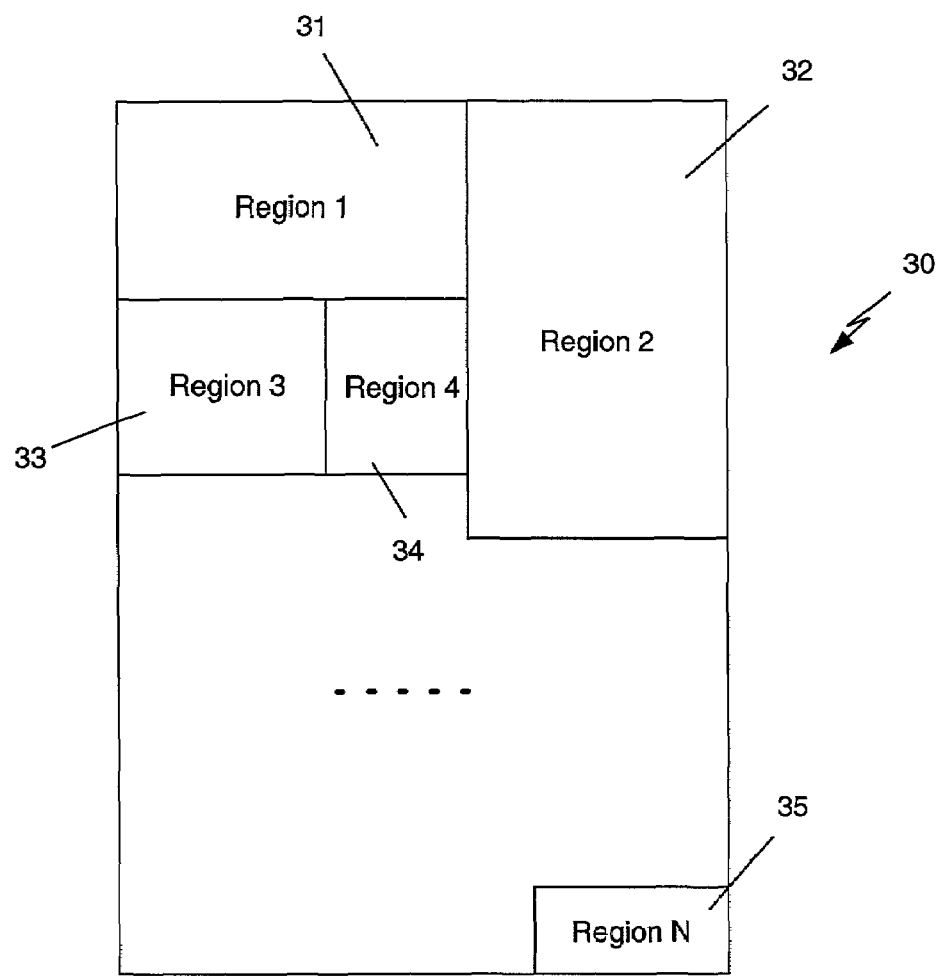
FIG. 2 is a diagram conceptually illustrating text layers and bodies of text each having a uniform color in the text layers.
Figure 3:
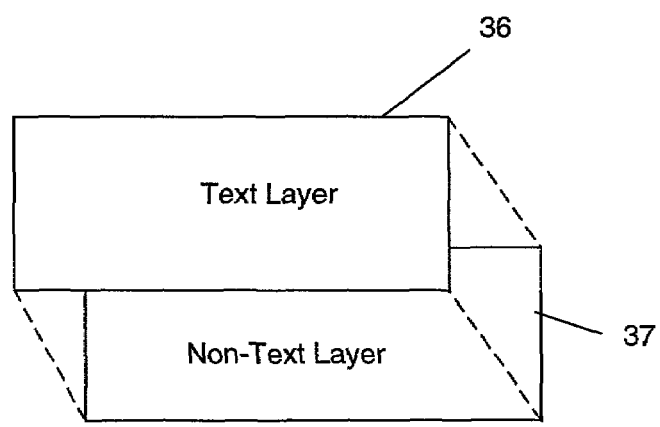
FIG. 3 is a diagram illustrating an exemplary text layer of FIG. 2 along with a corresponding non-text layer.

Bodies of text having the same color, for example, are used to define the physical space for each region. This feature maintains the color information for the text while also eliminating the need for a separate color layer. FIG. 2 is a diagram illustrating the exemplary use of bodies of text having the same or similar colors to define the regions. Document 30 includes various regions 31, 32, 33, 34, and 35 (regions 1–N) defining areas having text with the same or similar color. Typically, the entire document is divided into regions such that, when combined, all regions together represent the entire document. FIG. 3 is a diagram illustrating the relation between text and non-text layers. An exemplary text layer 36 has a corresponding non-text layer 37 having the same size. The other text layers can have different dimensions, and their sizes may depend upon the sizes of the corresponding regions.

The two layers 36 and 37 together constitute the color and pixel information for the corresponding region. When combined, they provide in effect the complete information contained in the portion of the document represented by the corresponding region. The non-text layer 37 can provide background colors, images, or other information for the text in the text layer 36. For example, in the completed document, the text may appear as characters on top of a picture or image, or simply characters on top of a solid background color. The images or other information in the non-text layers can exist in one of the regions or span multiple regions. Color values are specified for each pixel, for example, in the nontext layers and, therefore, the boundaries of the regions for the layers need not necessarily affect or alter the appearance of the document.

Figure 4:
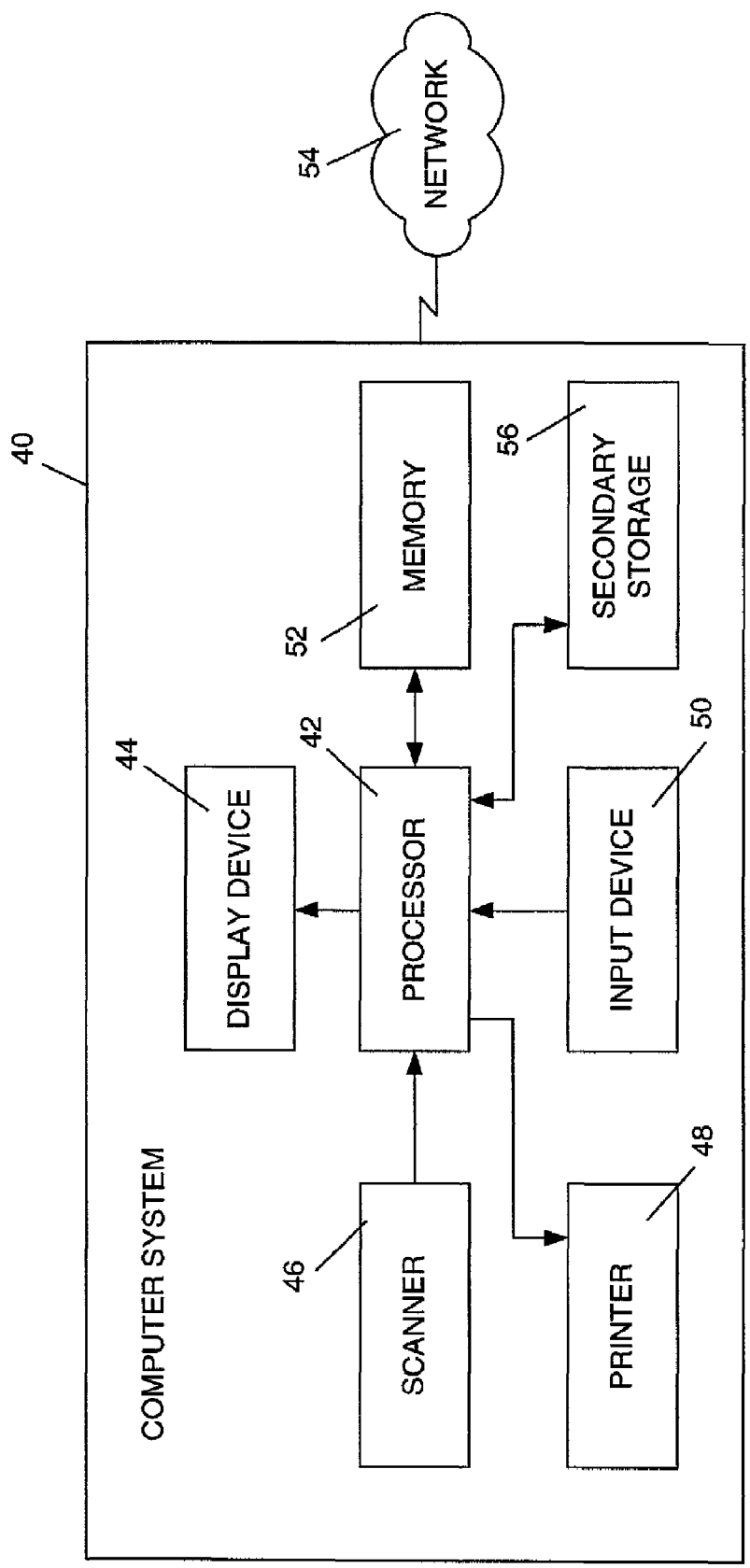
FIG. 4 is a block diagram of a computer system for use in formatting a document using two layers as illustrated in FIGS. 1, 2, and 3.

FIG. 4 is a block diagram of a computer system 40 for use in formatting a document using two layers as illustrated in FIGS. 1, 2, and 3. System 40 can include a connection with a network 54 such as the Internet. Network 54 represents any type of wireline or wireless network and can be used, for example, to transmit formatted and potentially compressed documents. Computer system 40 typically includes a memory 52, a processor 42, an input device 50, a display device 44, a printer 48, a secondary storage device 56, and a scanner 46.

Memory 52 may include random access memory (RAM) or similar types of memory, and it may store one or more applications for execution by processor 42. Secondary storage device 56 may include a hard disk drive, floppy disk drive, CD-ROM drive, or other types of non-volatile data storage. Processor 42 may execute applications or programs stored in memory 52 or secondary storage 56, or received from the Internet or other network 54. Input device 50 may include any device for entering information into computer system 40, such as a keyboard, key pad, cursor-control device, touch-screen (possibly with a stylus), or microphone.

Display device 44 may include any type of device for presenting visual information such as, for example, a computer monitor, flat-screen display, or display panel. Printer 48 may include any device for generating a hard copy of information. Scanner 46 may include any device for converting a hard copy of information into an electronic, digital form. Computer system 40 can also include output devices such as speakers for presenting information in audio form. Computer system 40 can possibly include multiple input devices, scanners, output devices such as printers, and display devices. The various components of computer system 40 can be included within the same physical machine or as different physical components connected together. For example, computer system 40 can include a conventional personal computer electrically connected with a separate scanner.

Although computer system 40 is depicted with various components, one skilled in the art will appreciate that this system can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or read-only memory (ROM). The computer-readable media may include instructions for controlling computer system 40 to perform a particular method.

Figure 5:
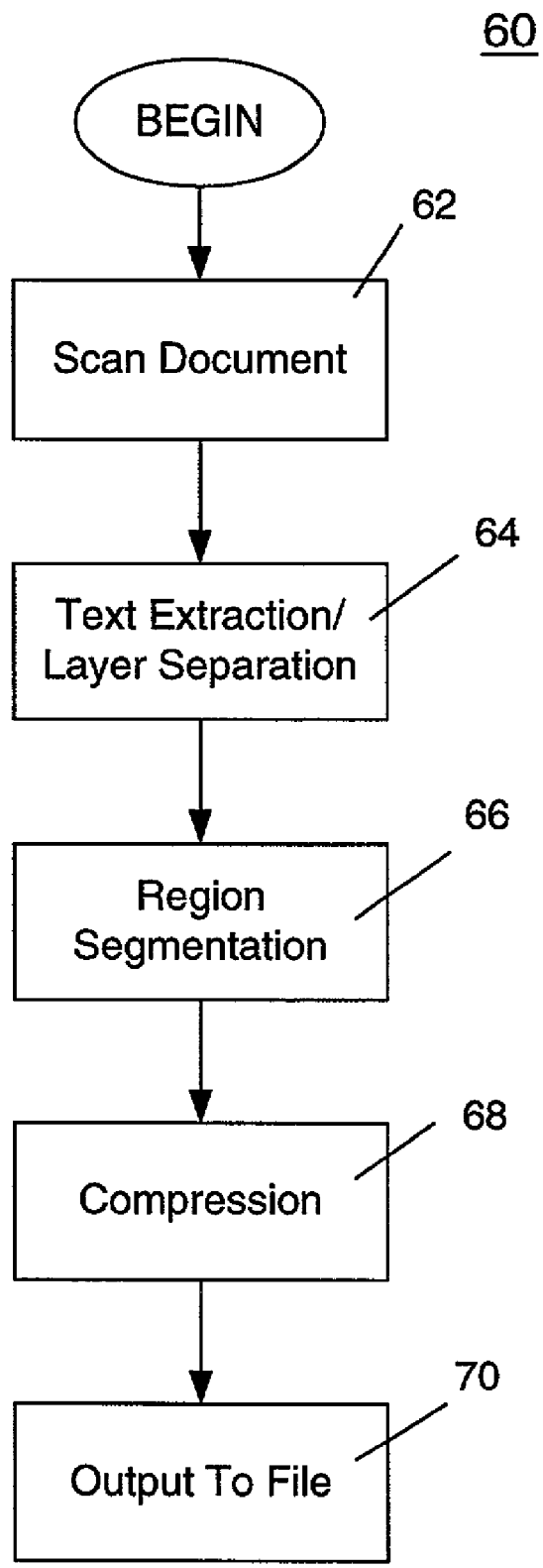
FIG. 5 is a flow chart of a method for execution by the computer system for formatting a document using a two layer format.

FIG. 5 is a flow chart of a method 60 for execution by computer system 40 for formatting a document using two layers as illustrated in FIGS. 1, 2, and 3. Method 60 can be implemented, for example, in software modules stored in memory 52 for execution by processor 42 along with appropriate user interaction, if required, via input device 50. In method 60, a document can be scanned into memory 52 using scanner 46 (step 62). The physical document can be scanned using any technique for converting it into an electronic, digital form.

Once scanned or otherwise converted into electronic form, the system can perform text extraction/layer separation for the document (step 64). In the scanned document, text can be identified by its sharp edges and uniform interior color. For each character identified, an average R, G, B color value, or other color information, is recorded. A non-layer text layer is then created by, for example, excluding all text pixels and adaptively filling the gap using neighboring pixel color.

The document can then be segmented into regions (step 66). In one exemplary embodiment, all of the text is segmented into a minimum number of non-overlapping rectangular regions. This segmentation can be accomplished by a number of techniques. For example, one technique involves starting from the top-left point in the scanned document and proceeding in the raster scan order, from top to bottom and from left to right. At the beginning of this process, a first region contains the first character identified. For each region, the range of color of all characters within that region is stored. Upon encountering a new character, it is compared with the existing adjacent text region to determine if they are close enough in terms of color. If they are sufficiently close, the new character is added into the existing text region and region information is updated to include the new character.

If the new character is not close in color to the existing region, a new region is created. This process is repeated until all characters are included in the regions.

The text layer can also include binary values associated with pixels in the region such as a binary value for each pixel. The binary pixel value specifies whether to use the text color or the color from the non-text layer for the corresponding pixel. For example, the binary value can specify a value "1" to use the text color and a value "0" to use the color identified in the non-text layer for the pixel. The reverse values, or other values, can alternatively be used for the pixels. Also, a binary value can be used with groupings of pixels in the non-text layer.

Color information is specified for the text in each of the regions and for pixels (or groupings of pixels) in the non-text layer. The color information can be specified using, for example, R, G, B values associated with the text in the regions, and using separate R, G, B values for the pixels or groupings of pixels in the non-text layers. The particular association of color information may depend upon, for example, the type of color values used and how the layers are compressed.

Once segmented, the layers in the regions can be compressed (step 68). Since each region has two layers, two compression techniques can be independently applied to the two layers. For example, a lossless method can be used to compress the text layer and a lossy one to compress the non-text layer. In order to further compress the non-text layer, it can be down-sampled to reduce the number of pixels before compression.

Use of a lossless compression method maintains a "sharp edge" and distinctiveness for display of textual characters, which can be important in avoiding a loss of meaning conveyed by the text. On the other hand, a lossy compression method can be used for images, for example, to achieve a greater compression ratio and where loss of some pixel information for the image is not as critical as for the text. An example of lossless compression is the G4 compression method, and an example of lossy compression is the Joint Photographic Experts Group (JPEG) standard for image compression. Other lossless and lossy compression methods can also be used, as well as other compression methods.

The compressed layers can be output to a file (step 70). The file can be stored, transmitted, or processed in other ways. For example, it can be attached to an e-mail and transmitted via a network. The compression results in a reduction in file size while still maintaining color information for the text.

Additional processing can also occur depending upon, for example, various types of two layer formatting or related viewers. For PDF files, for example, objects can be created after the compression. An XObject is created for the text layer and another XObject is created for the non-text layer. The text layer is specified as the mask of the non-text layer. This processing is only one such example, and different additional processing can occur depending upon a specific two layer formatting using the regions and segmentation discussed above.

While the present invention has been described in connection with an exemplary embodiment, it will be understood that many modifications will be readily apparent to those skilled in the art, and this application is intended to cover any adaptations or variations thereof. For example, different compression methods, and various methods for assigning color information to text and pixels, may be used without departing from the scope of the invention. This invention should be limited only by the claims and equivalents thereof.

What is claimed is:

1. A method for formatting a document, comprising:
   dividing the document into regions;
   specifying a text layer for text in a plurality of the regions, wherein each region of the plurality of the regions corresponds to text having the same color;
   specifying a non-text layer for the plurality of the regions; and
   identifying color information for the text in the text layers.

2. The method of claim 1, further comprising:
   compressing the text layers using a first compression technique; and
   compressing the non-text layers using a second compression technique.

3. The method of claim 2 wherein:
   the compressing the text layer step includes using a lossless compression method for the first compression technique; and
   the compressing the non-text layer step includes using a lossy compression method for the second compression technique.

4. The method of claim 1, further comprising associating a color value with pixels in the non-text layers.

5. The method of claim 4 wherein the associating the color value step includes specifying red-green-blue values for the pixels.

6. The method of claim 1, further including storing the layers of the plurality of the regions in a portable document format.

7. The method of claim 1 wherein the identifying step includes specifying a uniform text color for the text in the regions.

8. The method of claim 4 wherein the associating the color value step includes specifying background color information for the text layers.

9. An apparatus for formatting a document, comprising:
   a module for dividing the document into regions;
   a text module for specifying a text layer for text in a plurality of the regions, wherein each region of the plurality of the regions corresponds to text having the same color;
   a non-text module for specifying a non-text layer for the plurality of the regions; and
   a color module for identifying color information for the text in the text layers.

10. The apparatus of claim 9, further comprising a compression module for compressing the text layers using a first compression technique and for compressing the non-text layers using a second compression technique.

11. The apparatus of claim 10 wherein the compression module includes a module for providing a lossless compression method for the first compression technique and a lossy compression method for the second compression technique.

12. The apparatus of claim 9, further comprising a module for associating a color value with pixels in the non-text layers.

13. The apparatus of claim 12 wherein the module for associating the color value includes a module for specifying red-green-blue values for the pixels.

14. The apparatus of claim 9, further including a module for storing the layers of each of the regions in a portable document format.

15. The apparatus of claim 9 wherein the color module includes a module for specifying a uniform text color for the text in the regions.

16. The apparatus of claim 12 wherein the module for associating the color value includes a module for specifying background color information for the text layers.

* * * * *

UNITED STATES PATENT AND TRADEMARK OFFICE
CERTIFICATE OF CORRECTION

PATENT NO. : 7,145,676 B2
APPLICATION NO. : 09/774074
DATED : December 5, 2006
INVENTOR(S) : Jian Fan Page 1 of 1

It is certified that error appears in the above-identified patent and that said Letters Patent is hereby corrected as shown below:

In column 4, lines 49-50, delete "non-layer text" and insert -- non-text --, therefor.

Signed and Sealed this

Fifteenth Day of December, 2009

David J. Kappos
*Director of the United States Patent and Trademark Office*